(12) United States Patent
Peck

(10) Patent No.: US 9,880,924 B2
(45) Date of Patent: Jan. 30, 2018

(54) SOURCE CODE UNIT TESTING USING AN INDEXING TOOL

(71) Applicant: Red Hat, Inc., Raleigh, NC (US)

(72) Inventor: William F. Peck, Douglas, MA (US)

(73) Assignee: Red Hat, Inc., Raleigh, NC (US)

( * ) Notice: Subject to any disclaimer, the term of this patent is extended or adjusted under 35 U.S.C. 154(b) by 55 days.

(21) Appl. No.: 14/630,229

(22) Filed: Feb. 24, 2015

(65) Prior Publication Data

US 2016/0246709 A1    Aug. 25, 2016

(51) Int. Cl.
*G06F 9/44* (2006.01)
*G06F 11/36* (2006.01)

(52) U.S. Cl.
CPC ........ *G06F 11/3688* (2013.01); *G06F 11/368* (2013.01); *G06F 11/3672* (2013.01); *G06F 11/3696* (2013.01)

(58) Field of Classification Search
CPC ........ G06F 8/10; G06F 8/315; G06F 11/3676; G06F 11/3688; G06F 11/3696; G06F 11/3664; G06F 11/3414; G06F 17/30067; G06F 2101/00
See application file for complete search history.

(56) References Cited

U.S. PATENT DOCUMENTS

| | | | | |
|---|---|---|---|---|
| 5,673,387 A | * | 9/1997 | Chen | G06F 11/3688 707/999.202 |
| 5,778,169 A | * | 7/1998 | Reinhardt | G06F 11/3696 714/38.1 |
| 6,032,159 A | * | 2/2000 | Rivlin | G06F 17/30067 |
| 6,536,036 B1 | * | 3/2003 | Pavela | G06F 11/3676 707/999.104 |
| 6,694,509 B1 | * | 2/2004 | Stoval | G06F 11/3688 707/999.202 |
| 6,978,440 B1 | | 12/2005 | Pavela | |
| 7,165,074 B2 | | 1/2007 | Avvari et al. | |
| 8,359,189 B2 | | 1/2013 | Dalal et al. | |
| 8,561,036 B1 | | 10/2013 | Beans et al. | |
| 8,667,456 B1 | * | 3/2014 | Czymontek | G06F 8/315 707/696 |
| 8,719,805 B2 | | 5/2014 | Zhao | |
| 8,745,589 B2 | | 6/2014 | Arumugham et al. | |

(Continued)

FOREIGN PATENT DOCUMENTS

JP    2013149094 A    8/2013

OTHER PUBLICATIONS

Lunix ManPage, "Linux man page" May 2013, pp. 1-15 <ctags_Oct14.pdf>.*

(Continued)

*Primary Examiner* — Tuan Vu
(74) *Attorney, Agent, or Firm* — Lowenstein Sandler LLP

(57) ABSTRACT

A processing device indexes source code that include test functions that test corresponding functions in the source code. The processing device determines a function in the source code that contains a change, determines a set of functions in the source code that are affected by the change in the function, identifies one or more test functions in the set of functions, and creates a list of identified test functions. The list of identified test functions is a subset of the plurality of test functions to execute for testing the change.

20 Claims, 3 Drawing Sheets

(56) References Cited

U.S. PATENT DOCUMENTS

| | | | | |
|---|---|---|---|---|
| 8,806,450 B1* | 8/2014 | Maharana | ........... | G06F 11/3688 |
| | | | | 717/133 |
| 2005/0166094 A1* | 7/2005 | Blackwell | ........... | G06F 11/3664 |
| | | | | 714/38.14 |
| 2007/0022407 A1* | 1/2007 | Givoni | ................ | G06F 11/3414 |
| | | | | 717/124 |
| 2008/0104096 A1* | 5/2008 | Doval | ........................ | G06F 8/10 |
| 2013/0047140 A1 | 2/2013 | Shann et al. | | |

OTHER PUBLICATIONS

Stanford Development, "Development Tools", Oct 2014, pp. 1-3 <ctags_CVS_1014.pdf>.*

Eder et al. "Selecting Manual Regression Test Cases Automatically Using Trace Link Recovery and Change Coverage" 2014 [retrieved from http://dl.acm.org/citation.cfm?id=2593506].

LDRA Software Technology, "Delivering Software Quality and Security through Test, Analysis and Requirements Traceability" 2013 [retrieved from http://www.ldra.com/attachments/article/82/LDRA_TBrun v5.2.pdf].

Diwan et al. "Automatic Test Case Generation in Object Oriented Programming" International Journal of Electronics and Computer Science Engineering; 2012 [retrieved from http://www.ijecse.org/wp-content/uploads/2012/06/Volume-1Number-3PP-1433-1438.pdf].

* cited by examiner

SOURCE CODE UNIT TESTING USING AN INDEXING TOOL

TECHNICAL FIELD

The present disclosure relates to source code unit testing, and more particularly, to source code unit testing using an indexing tool.

BACKGROUND

Unit testing is a software testing method by which individual units of source code, sets of one or more computer program modules having associated control data, usage procedures, and operating procedures, are tested to determine whether the units, modules, and procedures meet design specification and operate as intended. Typically, a unit of source code is an individual function. Unit tests are short code fragments created by programmers for testing a corresponding unit of source code. The goal of unit testing is to isolate each part of a program to ensure that the individual parts are correct. The same unit tests are typically run against a corresponding function frequently as the source code for the program is developed and changed. If a unit test fails, generally, there is a bug either in the changed code or the tests. Depending on the size of the software project, the execution of the unit tests can generally take a significant amount of time. The software development can be delayed when tests fail, changes are made, and a full set of tests are then re-executed. Typically, even if a small portion of the source code has changed, all of the unit tests are run. The repeat execution of unnecessary tests can increase the time and resources used to develop a project.

BRIEF DESCRIPTION OF THE DRAWINGS

The present disclosure will be understood more fully from the detailed description given below and from the accompanying drawings of various implementations of the disclosure.

DETAILED DESCRIPTION

Implementations of the present disclosure describe source code unit testing using an indexing tool. Unit testing is a method for testing individual units of source code, sets of one or more computer program modules having associated control data, usage procedures, and operating procedures, to determine whether the units, modules, and procedures meet design specification and operate as intended. A unit of source code can be an individual function or method. A function is used as an example unit throughout this document. A unit test can test a particular function in the source code. Depending on the amount of source code, there can be a large number of unit tests, and the execution of the unit tests using traditional testing systems can take a significant amount of time. Typically, with conventional solutions, even if a small portion of the source code has changed, all of the unit tests are run. The repeat execution of unnecessary tests in traditional unit testing can increase the time and resources used to develop source code.

Implementations of the present disclosure identify which function(s) have been changed, which function(s) in the source code are affected by the change(s), and the subset of test units to execute for the changed and affected functions. Implementations of the present disclosure can reduce the amount of time and resources used for developing the source code by executing only the unit tests that pertain to a changed function and/or function affected by the change. Implementations of the present disclosure remove unnecessary unit testing and customize unit testing for each changed function.

Figure 1:
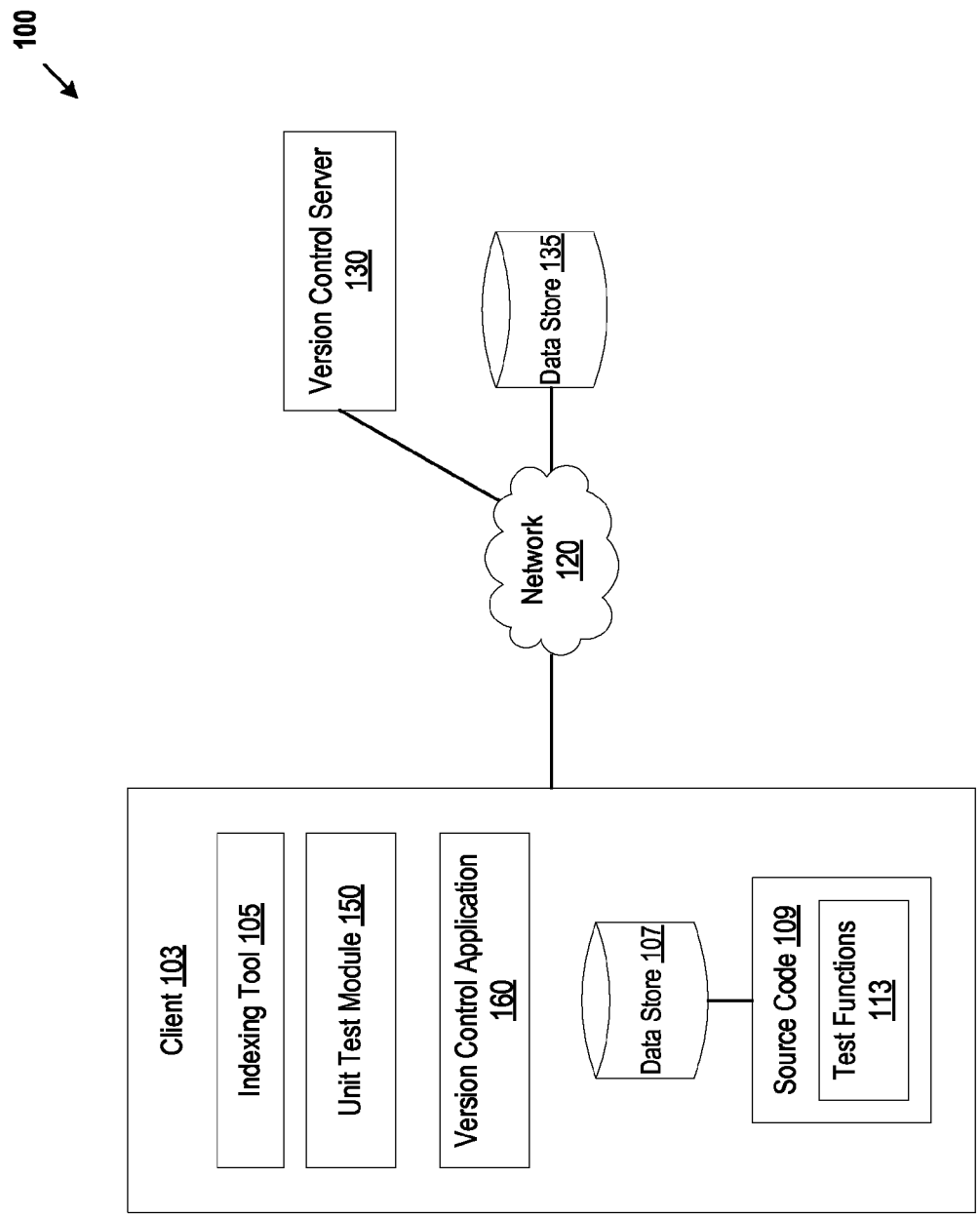
FIG. 1 illustrates an example system architecture, in accordance with various implementations.

FIG. 1 is an example system architecture 100 for various implementations. The system architecture 100 can include a version control system. The version control system can include a version control server 130 and one or more data stores 135 coupled to one or more clients 103 via one or more networks 120. The networks 120 can be public networks (e.g., the Internet), private networks (e.g., a local area network (LAN) or wide area network (WAN)), or a combination thereof. The version control system can be a distributed system or a centralized system. In centralized systems, there is a "master" repository, which every developer can submit source code changes into. In distributed systems, each user (e.g., software developer) works with a local repository (e.g., data store 107) on a client 103 computing machine. There can be a central repository (e.g., data store 135) coupled to a server (e.g., version control server 130) for sharing code in a distributed version control system. A distributed version control system is used as an example version control system throughout this document. An example distributed version control system can include, and is not limited to, Git.

The clients 103 can include a version control application 160 and one or more local data stores 107 as part of the distributed version control system. The client 103 can store one or more files in a working directory in the data, store 107. The files can store source code (e.g., source code 109). The source code 109 can include unit test functions test functions 113). "Unit test function" is hereinafter also referred to as "test function or unit test". Unit tests are short code fragments created by users (e.g., software programmers) for testing a unit (e.g., function) of source code.

A file containing source code 109 can be in one of several states, in one implementation, there are three states (1) unmodified or committed, (2) modified, and (3) staged. For the unmodified or committed state, the file is in its last committed state and has no local modifications. For the modified state, the file has been changed since it was last committed. For the staged state, the file was changed and added to a staging area for including the changes in a next commit operation. Because a file can be staged partially, a file can be both staged and modified. The client 103 can store a file for source code in a committed state, and while a user is making changes to the source code, the client 103 can have a file for the source code in a modified state.

The client 104 can include a unit test module 150 for reducing the number of unit test functions that are executed when testing source code 109 that has changed. The unit test module 150 can identify one or more functions that have changed in the source code 109, identify one or more other functions, including test functions, in the source code 109 that are affected by the changed function(s), and determine which test function(s) are associated with the changed function(s) and affected function(s). The test function(s) that are associated with the changed function and affected function(s) are a subset of all of the test functions that are included in the source code 109. The unit test module 150 can execute the subset of test functions to reduce the amount of time for testing the changes made to the source code 109.

The unit test module 150 can use a version control application 160 to identify the changed function(s). The unit test module 150 can cause the version control application 160 to execute a command (e.g., "git diff-W") to generate differential data that indicates the lines of code that are different between a file for the source code in a committed state and a file for the source code in a modified state. The unit test module 150 can determine a name for each function that has changed from the differential data, as described in greater detail below in conjunction with FIG. 2.

The unit test module 150 can use index data produced by an indexing tool 105 to determine which function(s), including test functions, in the source code 109 are affected by the changed function(s). The indexing tool 105 can index the source code 109 and determine relationships between functions in the source code 109. For example, the indexing tool 105 can determine the functions that call a particular function and the functions that are being called by the particular function. Examples of an indexing tool 105 can include and are not limited to cscope and ctags. In one implementation, the index data that is used by the unit test module 150 is a searchable database for the source code 105 that is created by the indexing tool 105 and any search result sets that are produced from querying the database. The unit test module 150 can use the name of each changed function as input to search the database for functions that call the changed function and for the functions that are being called by the changed function. In one implementation, the database can return a search result set that contains the callers and callees of a changed function. A caller hereinafter refers to a function that is calling another function, and a callee hereinafter refers to a function that is being called by another function. In one implementation, the index data includes a look up table, which represents the relationships of callers and callees of the functions in the source code 109, generated by the indexing tool 105. The unit test module 150 can use the name of each changed function as input to search the look up table to determine the callers and callees of the changed function.

The unit test module 150 can determine which test function(s) to execute based on the callers and callees of the changed function(s), as described in greater detail below in conjunction with FIG. 2. The unit test\module 150 can use the indexing tool 105 recursively to determine which function(s) of the affected function(s) contain a nested function, which function(s) of the affected function(s) call other function(s), and which function(s) of the affected function(s) are being called by other functions, as described in greater detail below in conjunction with FIG. 2. The unit test module 150 can determine which other function(s) are affected by a nested function and determine which test function(s) to execute based on the callers and callees of a nested function.

The revision control server 130 and client(s) 103 can be hosted on computing machines. The computing machines can be can be computing devices, such as server computers, desktop computers, set-top boxes, gaming consoles, televisions, portable computing devices such as, and not limited to, mobile telephones, personal digital assistants (PDAs), portable media players, netbooks, laptop computers, an electronic book reader, and the like.

A data store 107,135 can be a persistent storage that is capable of storing data. A persistent storage can be a local storage unit or a remote storage unit. Persistent storage can be a magnetic storage unit, optical storage unit, solid state storage unit, electronic storage units (main memory), or similar storage unit. Persistent storage can be a monolithic device or a distributed set of devices. A 'set', as used herein, refers to any positive whole number of items.

Figure 2:
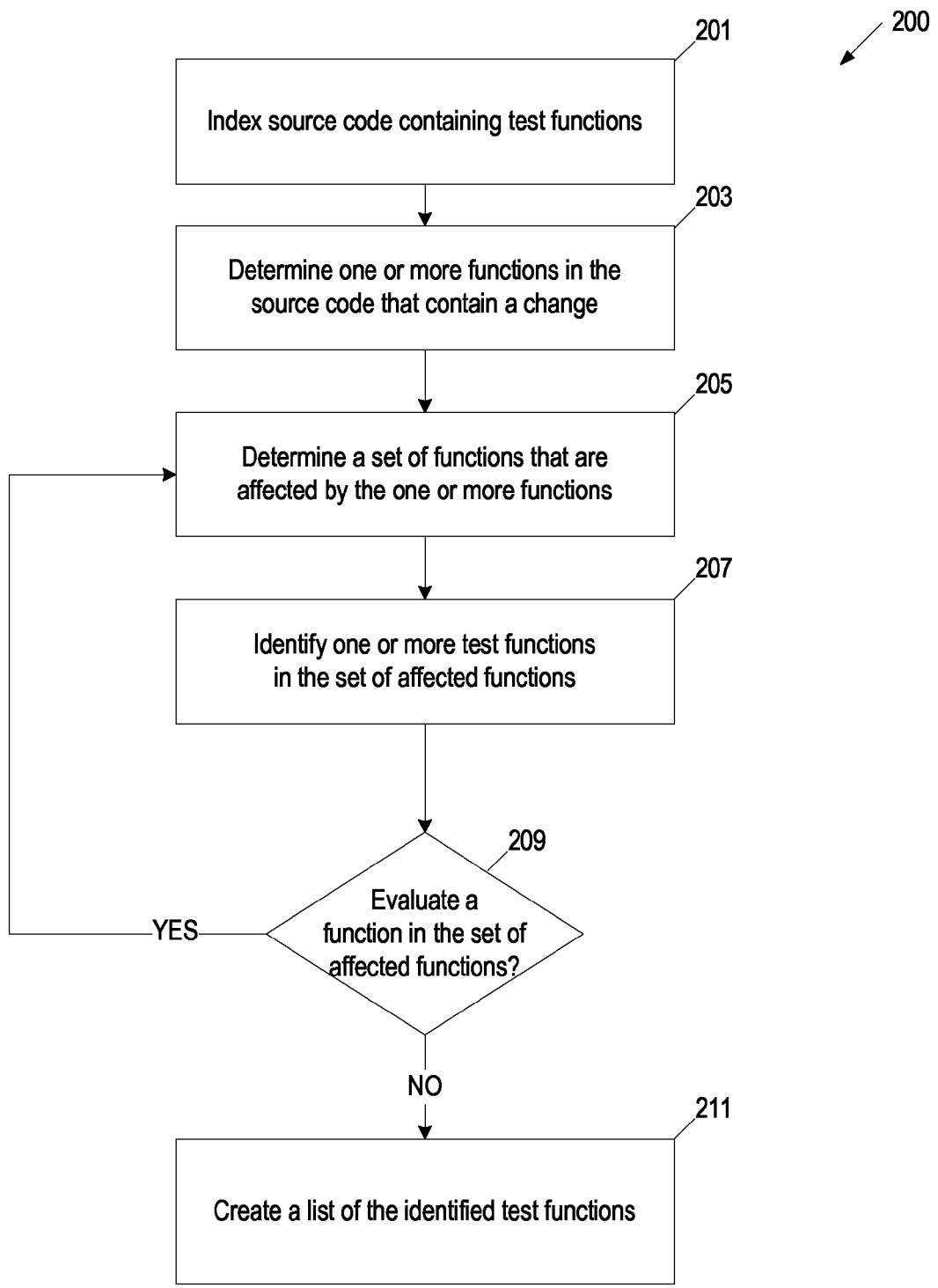
FIG. 2 is a flow diagram for a method for source code unit testing using an indexing tool, in accordance with one or more implementations of the present disclosure.

FIG. 2 is a flow diagram for a method 200 for source code unit testing using an indexing tool, in accordance with one or more implementations of the present disclosure. Method 200 can be performed by processing logic that can comprise hardware (e.g., circuitry, dedicated logic, programmable logic, microcode, etc.), software (e.g., instructions run on a processing device), or a combination thereof. In one implementation, method 200 is performed by a unit test module (e.g., unit test module 150 of FIG. 1) executing in a computing machine. At least a portion of method 200 can be performed automatically by the computing machine without user interaction.

At block 201, the computing machine indexes source code. The source code contains functions and corresponding unit test functions for testing the functions in the source code. The code for the test functions resides in the same version control repository as the source code. In one implementation, the source code is in C programming language. In another implementation, the source code is in C++ programming language. In one implementation, the source code is indexed prior to the source code being committed to a version control repository. For example, the indexing can occur when a request to test the source code is received. For example, the computing machine can receive user (e.g., software developer) input of a command via user interface (e.g., command line interface) to execute test functions in the source code, and the computing machine can use an indexing tool to index the source code and the test code in response to the test command. The indexing tool can generate index data (e.g., searchable database, search results sets, look up table) from indexing the source code. The index data can be stored in a data store that is coupled to the computing machine.

At block 203, the computing machine determines one or more functions that include a change in the source code. The computing machine can execute a command (e.g., git diff-W) that generates differential data indicating what code in the source code has changed. The current version of the source code can be compared to the most recent committed version of the source code in the version control system.

The differential data can include the lines of source code that have changed. The computing machine can parse the differential data to search for function(s) that contain a change in the respective function code, and search for a name of the function that includes changed code. There can be multiple functions that have changed code. The computing machine can parse the differential data to determine a name for each changed function and generate a list of the names of the changed function(s).

At block 205, the computing machine determines a set of functions that are affected by the one or more changed functions. The set of functions that are affected by the changed function(s) can include test functions and non-test functions. A test function is a function that is used to test a function (non-test function) in the source code. A non-test function is a function that is part of the software being developed by the source code. The computing machine can use the list of names of the changed function(s) and the index data (e.g., searchable database, search results sets, look up table) to determine the set of functions that are affected by the changed function(s). As described above, the index data indicates which functions call a particular function and which function(s) are being called by the particular function. The computing machine can determine the function(s) that are affected by each changed function. The computing machine can determine, for each name in the list of changed function(s), which functions call the changed function and which functions are being call by the changed function.

The computing machine can receive a list of affected functions. For example, the computing machine can use the name of each changed function to search an index database for affected functions and receive a search result set. The search result set can be a list of the affected functions. In another example, the computing machine uses the name of each changed function as input for a look up table to determine the affected functions and generates a list of the affected functions. For example, the list of changed function(s) may include FunctionA and FunctionX. The computing machine may determine, from the index data, that FunctionB, FunctionC, Test_1, Test_2, and Test_3 are the functions that are affected by the changed FunctionA, and that FunctionY, Test_8, and Test_9 are the functions that are affected by the changed FunctionX. The list of affected functions can include functions for the software program being developed and test functions that are used to test the source code. For example, the list of affected functions can include FunctionB, FunctionC, Test_1, Test_2, Test_3, FunctionY, Test_8 and Test_9. For simplicity and brevity, a list of two changed functions and a list of eight affected functions are used as examples. The list of changed functions and the list of affected functions can include any number of functions.

At block 207, the computing machine identifies one or more test functions in the set of affected functions. In one implementation, each unit test function in the source code is marked to indicate that the particular unit test function is a program for testing a corresponding function (non-test function). An example of marking the unit test functions can include pre-pending the names of the individual unit test functions. For example, each name of a unit test function may be pre-pended with "Test_" to indicate that the corresponding code is part of a unit test.

In another implementation, each unit test function in the source code is associated, via user input, with a particular directory as a means to identify which functions in the source code are used for testing. The marking (e.g., pre-pending) of the unit test functions and the associating of unit test functions with a particular directory can be based on user input (e.g., software developer) and/or based on configuration data that is stored in the data store. For example, the configuration data can specify how to mark the unit test functions and/or which directory to associate with the unit test functions.

The computing machine can search the set of affected functions for function names that are pre-pended and/or functions that are associated with a particular directory. For example, the list of affected functions may include FunctionB, FunctionC, Test_1, Test_2, Test_3, FunctionY, Test_8 and Test_9, and the computing machine may determine that Test_1, Test_2, Test_3, Test_8 and Test_9 are test functions. The list of the set of affected functions can include directory information for the functions in the list.

At block 209, the computing machine determines whether to evaluate a function in the set of affected functions. One or more of the affected functions can include a nested function. One or more of the affected functions can be called by other functions. One or more of the affected functions can call other functions. For example, the list of affected functions may include FunctionB, FunctionC, FunctionY and test functions Test_1, Test_2, Test_3, Test_8 and Test_9. FunctionB and FunctionC may call the changed FunctionA, and FunctionY may call changed FunctionX. The computing machine can determine that there is a function (e.g., FunctionB, FunctionC, FunctionY) that is a caller or callee of a changed function (e.g., FunctionA, FunctionX) in the list of affected functions (block 209), and return to block 205 to determine a set of functions that are affected by the function that is in the list of affected function. For example, the computing machine can return to block 205 and input the name "FunctionB" in the index database to determine what functions are affected by FunctionB. The computing machine can identify one or more test functions that are affected by FunctionB at block 207.

The computing machine can perform at least a portion of method 200 multiple times depending on the list of affected functions. For example, after determining which functions are affected by FunctionB, the computing machine can determine which functions are affected by FunctionC, FunctionY, etc. The computing machine can include error detection to help prevent performing a loop of operations pertaining to method 200.

If there are no more functions to evaluate at block 209, the computing machine creates a list of the identified test functions at block 211. The list of identified test functions includes the test functions that are affected by the changed function(s) (e.g., FunctionA, FunctionX), any test functions that pertain to any of the affected functions (e.g., FunctionB, FunctionC, FunctionY, etc.), etc. The list of the identified test function(s) are the unit test functions to execute for testing the changed function(s). The list of the identified test functions is a subset of all of the test functions in the source code. The computing machine can execute the test function(s) in the list of identified test functions and provide test results to a user (e.g., software developer).

Figure 3:
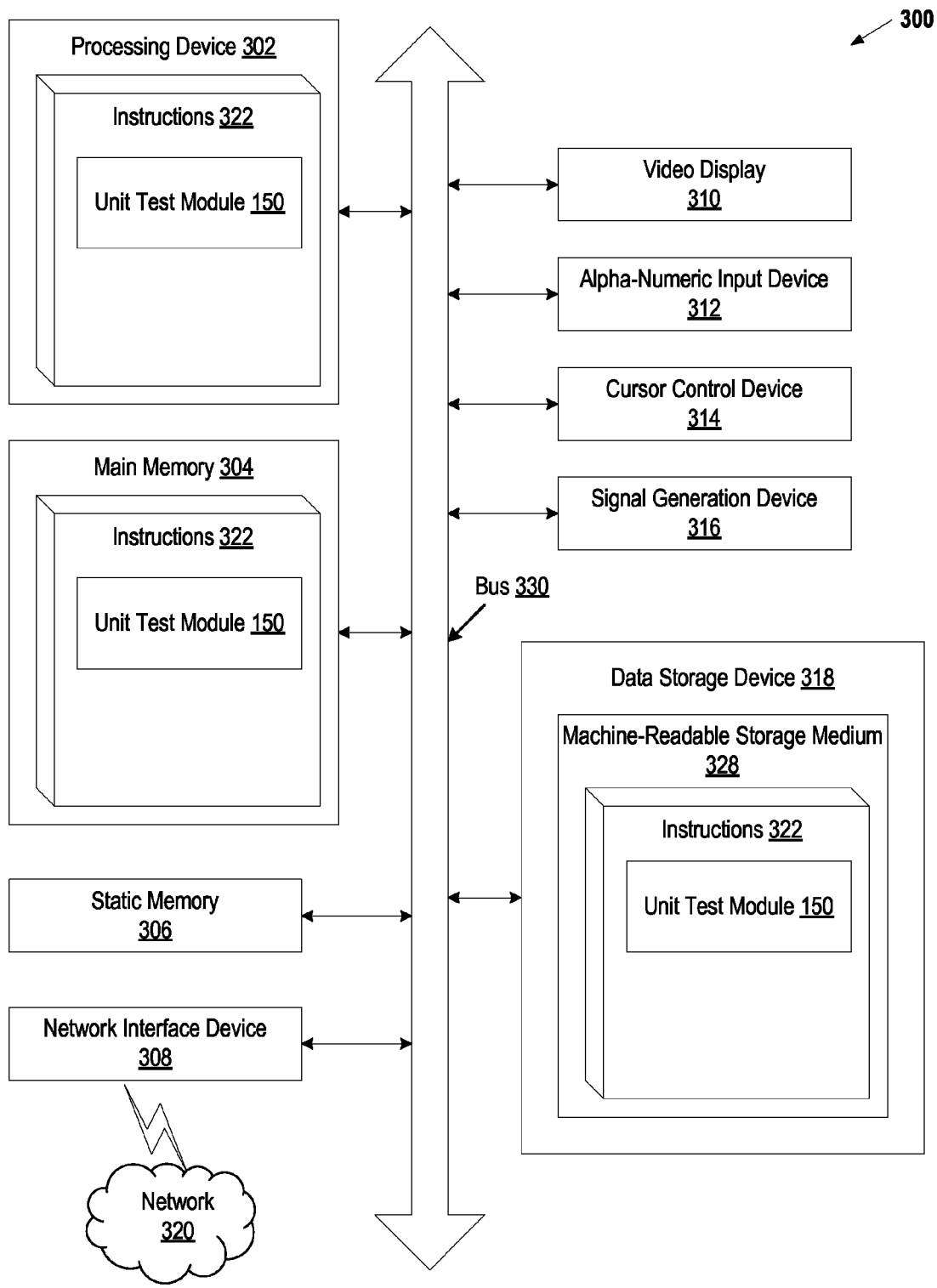
FIG. 3 is a block diagram of an example computer system that may perform one or more of the operations described herein.

FIG. 3 illustrates an example machine of a computer system 300 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 300 includes a processing device 302, a main memory 304 (e.g., read-only memory (ROM), flash memory, dynamic random access memory (DRAM) such as synchronous DRAM (SDRAM) or DRAM (RDRAM), etc.), a static memory 306 (e.g., flash memory, static random access memory (SRAM), etc.), and a data store device 318, which communicate with each other via a bus 330.

Processing device 302 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 302 may also be one or more special-purpose processing devices such as an application specific integrated circuit (ASIC), a field programmable gate array (FPGA), a digital signal processor (DSP), network processor, or the like. The processing device 302 is configured to execute instructions 322 for performing the operations and steps discussed herein.

The computer system 300 may further include a network interface device 308. The computer system 300 also may include a video display unit 310 (e.g., a liquid crystal display (LCD) or a cathode ray tube (CRT), an alphanumeric input device 312 (e.g., a keyboard), a cursor control device 314 (e.g., a mouse), and a signal generation device 316 (e.g., speaker).

The data storage device 318 may include a machine-readable storage medium 328 (also known as a computer-readable medium) on which is stored one or more sets of instructions or software 322 embodying any one or more of the methodologies or functions described herein. The instructions 322 may also reside, completely or at least partially, within the main memory 304 and/or within the processing device 302 during execution thereof by the computer system 300, the main memory 304 and the processing device 302 also constituting machine-readable storage media.

In one implementation, the instructions 322 include instructions for a unit test module (e.g., unit test module 150 of FIG. 1), and/or a software library containing methods that call the unit test module. While the machine-readable storage medium 328 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "indexing" or "determining" or "identifying" or "creating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A computer-implemented method comprising one or more computing devices having one or more processors coupled with memory-stored executable instructions, which when executed by the one or more processors, cause the method to be performed, comprising:

indexing, by the one or more processors, source code comprising a plurality of test functions and a plurality of non-test functions to create index data, wherein the plurality of test functions in the source code test corresponding non-test functions in the source code, and wherein the index data specifies relationships between the plurality of non-test functions in the source code and the plurality of test functions in the source code;

determining, by the one or more processors, one of the plurality of non-test functions containing a change in the source code;

querying, by the one or more processors, using the a function name of the one of the plurality of non-test functions containing the change, the index data to determine a set of affected functions in the source code that are affected by the change in the one of the plurality of non-test functions;

receiving, by the one or more processors, a search result from the querying, the search result comprising the set of affected functions from the plurality of test functions in the source code and the plurality of non-test functions in the source code;

identifying, by the one or more processors, one or more test functions in the source code that are part of the set of affected functions; and creating, by the one or more processors, a list of identified test functions in the source code, wherein the list of identified test functions is a subset of the plurality of test functions in the source code to be executed for testing the change to the one of the plurality of non-test functions.

2. The method of claim 1, wherein the indexing comprises:
   indexing the source code using at least one of a ctags indexing tool or a cscope indexing tool.

3. The method of claim 1, wherein the plurality of test functions are at least one of pre-pended or associated with a particular directory to indicate that the plurality of test functions are used to test the source code.

4. The method of claim 1, further comprising:
   for each non-test function in of the set of affected functions, determining another set of affected functions that are affected by a respective non-test function in the set of affected functions.

5. The method of claim 1, wherein the index data comprises a list of caller functions and callee functions of the one of the plurality of non-test functions containing the change.

6. The method of claim 1, wherein the source code comprises at least one of C source code or C++ source code.

7. The method of claim 1, wherein code for the plurality of test functions reside in a same version control repository as the source code.

8. A non-transitory computer-readable storage medium including instructions that, when executed by a processing device, cause the processing device to:
   index source code comprising a plurality of test functions and a plurality of non-test functions to create index data, wherein the plurality of test functions in the source code test corresponding non-test functions in the source code, and wherein the index data specifies relationships between the plurality of non-test functions in the source code and the plurality of test functions in the source code;
   determine one of the plurality of non-test functions containing a change in the source code;
   query, by the processing device, using a function name of the one of the plurality of non-test functions containing the change, the index data to determine a set of affected functions in the source code that are affected by the change in the one of the plurality of non-test functions;
   receive a search result from the query, the search result comprising the set of affected functions from the plurality of test functions in the source code and the plurality of non-test functions in the source code;
   identify one or more test functions in the source code that are part of the set of affected functions; and
   create a list of identified test functions in the source code, wherein the list of identified test functions is a subset of the plurality of test functions in the source code to be executed for testing the change to the one of the plurality of non-test functions.

9. The non-transitory computer-readable storage medium of claim 8, wherein to index the source code, the processing device is to:
   index the source code using at least one of a ctags indexing tool or a cscope indexing tool.

10. The non-transitory computer-readable storage medium of claim 8, wherein the plurality of test functions are at least one of pre-pended or associated with a particular directory to indicate that the plurality of test functions are used to test the source code.

11. The non-transitory computer-readable storage medium of claim 8, wherein the processing device is further to:
   for each non-test function in of the set of affected functions, determine another set of affected functions that are affected by a respective non-test function in the set of affected functions.

12. The non-transitory computer-readable storage medium of claim 8, wherein the index data comprises a list of caller functions and callee functions of the one of the plurality of non-test functions containing the change.

13. The non-transitory computer-readable storage medium of claim 8, wherein the source code comprises at least one of C source code or C++ source code.

14. The non-transitory computer-readable storage medium of claim 8, wherein code for the plurality of test functions reside in a same version control repository as the source code.

15. A system comprising:
   a memory;
   a processing device, operatively coupled to the memory to:
      index source code comprising a plurality of test functions and a plurality of non-test functions to create index data, wherein the plurality of test functions in the source code test corresponding non-test functions in the source code, and wherein the index data specifies relationships between the plurality of non-test functions in the source code and the plurality of test functions in the source code;
      determine one of the plurality of non-test functions containing a change in the source code;
      query, using a function name of the one of the plurality of non-test functions containing the change, the index data to determine a set of affected functions in the source code that are affected by the change in the one of the plurality of non-test functions;
      receive a search result from the querying, the search result comprising the set of affected functions from the plurality of test functions in the source code and the plurality of non-test functions in the source code;
      identify one or more test functions in the source code that are part of the set of affected functions; and
      create a list of identified test functions in the source code, wherein the list of identified test functions is a subset of the plurality of test functions in the source code to be executed for testing the change to the one of the plurality of non-test functions.

16. The system of claim 15, wherein to index the source code, the processing device is to:
index the source code using at least one of a ctags indexing tool or a cscope indexing tool.

17. The system of claim 15, wherein the plurality of test functions are at least one of pre-pended or associated with a particular directory to indicate that the plurality of test functions are used to test the source code.

18. The system of claim 15, wherein the processing device is further to:
for each non-test function in of the set of affected functions, determine another set of affected functions that are affected by a respective non-test function in the set of affected functions.

19. The system of claim 18, wherein the index data comprises a list of caller functions and callee functions of the one of the plurality of non-test functions containing the change.

20. The system of claim 15, wherein the source code comprises at least one of C source code or C++ source code.

* * * * *